United States Patent [19]

Blahut

[11] Patent Number: 4,677,545

[45] Date of Patent: Jun. 30, 1987

[54] MICROPROCESSOR HAVING MACRO-ROM AND MAIN PROGRAM QUEUES

[75] Inventor: Donald E. Blahut, Holmdel, N.J.

[73] Assignees: American Telephone and Telegraph Company; AT&T Bell Laboratories, both of Murray Hill, N.J.

[21] Appl. No.: 660,049

[22] Filed: Oct. 12, 1984

[51] Int. Cl.⁴ .............................................. G06F 9/30
[52] U.S. Cl. .................................................. 364/200
[58] Field of Search ... 364/200 MS File, 900 MS File

[56] References Cited

U.S. PATENT DOCUMENTS 4,278,837  7/1981  Best ................................ 364/900 X Primary Examiner—Thomas M. Heckler
Attorney, Agent, or Firm—David I. Caplan

[57] ABSTRACT

A microprocessor with a macro-rom exhibits reduced latency time and greater flexibility by including both a macro-rom queue and a main program queue. The arrangement eliminates the undesirable latency associated with fetching program as part of a return sequence from a macro-rom instruction. Also, the arrangement allows parameters to be extracted from the main program queue as the macrosequence is executing from the macro-roms program queue.

8 Claims, 2 Drawing Figures

MICROPROCESSOR HAVING MACRO-ROM AND MAIN PROGRAM QUEUES

FIELD OF THE INVENTION

This invention relates to microprocessor organizations and more particularly to such an organization including a macro-rom.

BACKGROUND OF THE INVENTION

A microprocessor includes a datapath portion and a control portion. Data and addresses are manipulated in the datapath portion. The control portion is operative to decode instructions in a program into a form suitable for controlling that manipulation. Programs typically are stored in a main memory external to the chip and include sequences of instructions and data at specified addresses in the memory.

The control portion of the microprocessor conveniently comprises a programmable logic array (PLA) for decoding instructions from main memory as well as auxiliary logic circuitry for applying decoded instructions to the datapath. A PLA includes an input register and an output register each having a set of latches. Instructions from main memory are applied to the latches of the input register typically during a first phase of each clock cycle of operation. During a second phase of each cycle, the latches of the output register are set to provide the binary code for controlling the datapath for the next subsequent cycle of operation. An instruction applied to the input register is called an op-code, and the output of the PLA (output register) is called a line of microcode. Each such line of microcode determines the "state" of the microprocessor for the instant cycle of operation.

A PLA is characterized by feedback loops between the output register and the input register. These feedback loops carry binary data back to the input register to modify some bits of the input to the PLA in a manner to generate a sequence of related states. A PLA is able, thus, to generate a sequence of related microcode lines in response to each of one or more instructions in the program.

As is most often the case, data located at more than a single address in the main memory are required in order for even a single instruction to produce useful results. These data must be accessed and moved to ("fetched" from main memory) on-chip registers in the datapath under the control of consecutive microcde lines in response to the single instruction. It typically takes a number of clock cycles to accomplish this movement of data even in response to a single instruction.

The requisite number of clock cycles for such movement is reduced if the microprocessor includes an on-chip queue in which the instructions and data for a portion of a program can be stored. If this portion of the program is "prefetched" (i.e., fetched during earlier cycles) and stored in an on-chip queue in consecutive locations in the queue, the program can then be executed without wasting extra cycle time to access data stored in the main memory. Instead, the requisite instructions and data, when required, are obtained in a single cycle from the first location in the queue. Instructions in the queue are then applied to the input register of the PLA, and data in the queue are applied to elements of the datapath. Limitations imposed upon the speed of microprocessor operation by the bandwidth of the input/output (I/O) bus which carries instructions from main memory are thus reduced in microprocessors which include such a program queue into which such prefetched instructions and data are stored temporarily.

A macro-rom is used to store on-chip, frequently-used programs called "routines". Such routines are often called for in the execution of certain instructions called "macro-instructions." A macro-rom is a word organized, on-chip, read-only-memory (ROM) operative to generate an ouput sequence of binary codes (coded words) in response to a corresponding sequence of input codes. The input codes are applied to the macro-rom from an on-chip register controlled by the output register of the PLA.

Operation of the macro-rom is initiated when a program in main memory calls for a macro-instruction to be applied to the input register of the PLA. The PLA responds to generate microcode, specified bits of which set specified latches of the output register of the PLA for configuring the datapath elements (i.e., the queue, counter, address register, . . . ) to execute routines stored in the macro-rom and for activating the macro-rom as well. In turn, the macro-rom applies appropriate portions of the routine to the PLA input register. The routine is selected by the macro-instruction which specifies the addresses in the macro-rom at which the firt byte of the selected routine is stored.

Consecutive macro-rom outputs typically are not applied directly to the PLA because a macro-rom instruction is not necessarily aligned in a proper field for the input register of the PLA, and execution is slow due to the requirement of several clock cycles for accessing a macro-rom memory to obtain an instruction. Instead, the selected macro-rom program is also stored in the queue. However, the selected routine cannot be stored in the queue without first erasing all unexecuted data then stored in the queue when the macro-rom is activated. The reason for this is that the queue is a sequential memory which can be loaded only from one end and read out only from the other. In the absence of erasing the unexecuted data, the routine from the macro-rom thus would not be located properly with respect to the unexecuted program already in the queue and would often occupy more space than would be available in the queue. Consequently, for proper operation, unexecuted program is erased and the queue is filled with a routine from the macro-rom.

When the routine is completely executed, execution of the (main) program in main memory resumes. But a significant latency time is incurred before such execution can resume. The latency time arises because the queue had been erased and the appropriate segment of the main program must again be fetched into the queue. Several clock cycles are required for such a fetch operation. This latency is undesirably long.

Another problem with the use of a macro-rom stems from the fact that all data to be fetched from the main memory (operands or operand descriptor or pointers) associated with a macro-instruction must be fetched and stored in on-chip registers (and not in the queue) prior to the activation of the macro-rom. The reason for this is because any such operands or operand descriptors associated with the macro-instruction would otherwise be erased from the queue and therefore would be inaccessible once the activation of the macro-rom occurs.

BRIEF DESCRIPTION OF AN ILLUSTRATIVE EMBODIMENT OF THE INVENTION

A second queue is added to overcome the foregoing problems. This second queue is adapted to receive routines from the macro-rom exclusively. Consequently, the first queue need never be erased when a routine is to be executed. A multiplexer under PLA control is adapted to accept outputs from either of the two queues. At the conclusion of the routine, the first queue still typically contains the next instruction to be executed thus obviating the need for refetching that data from the main memory.

The use of two queues along with a multiplexer permits further operation enhancements. For example, a dedicated operand or operand descriptor can be identified and included in the routine in order to provide an "escape" when the dedicated operand or descriptor is encountered during execution of a routine. The escape causes a temporary switch of the multiplexer to the first queue for extracting the next operand required for execution. Thereafter, the multiplexer switches back to the second queue. The ability to switch operation back and forth between the first and the second queues enables an operand to be extracted quickly by the routine at the most appropriate time during the execution of the routine.

DETAILED DESCRIPTION

Figure 1:
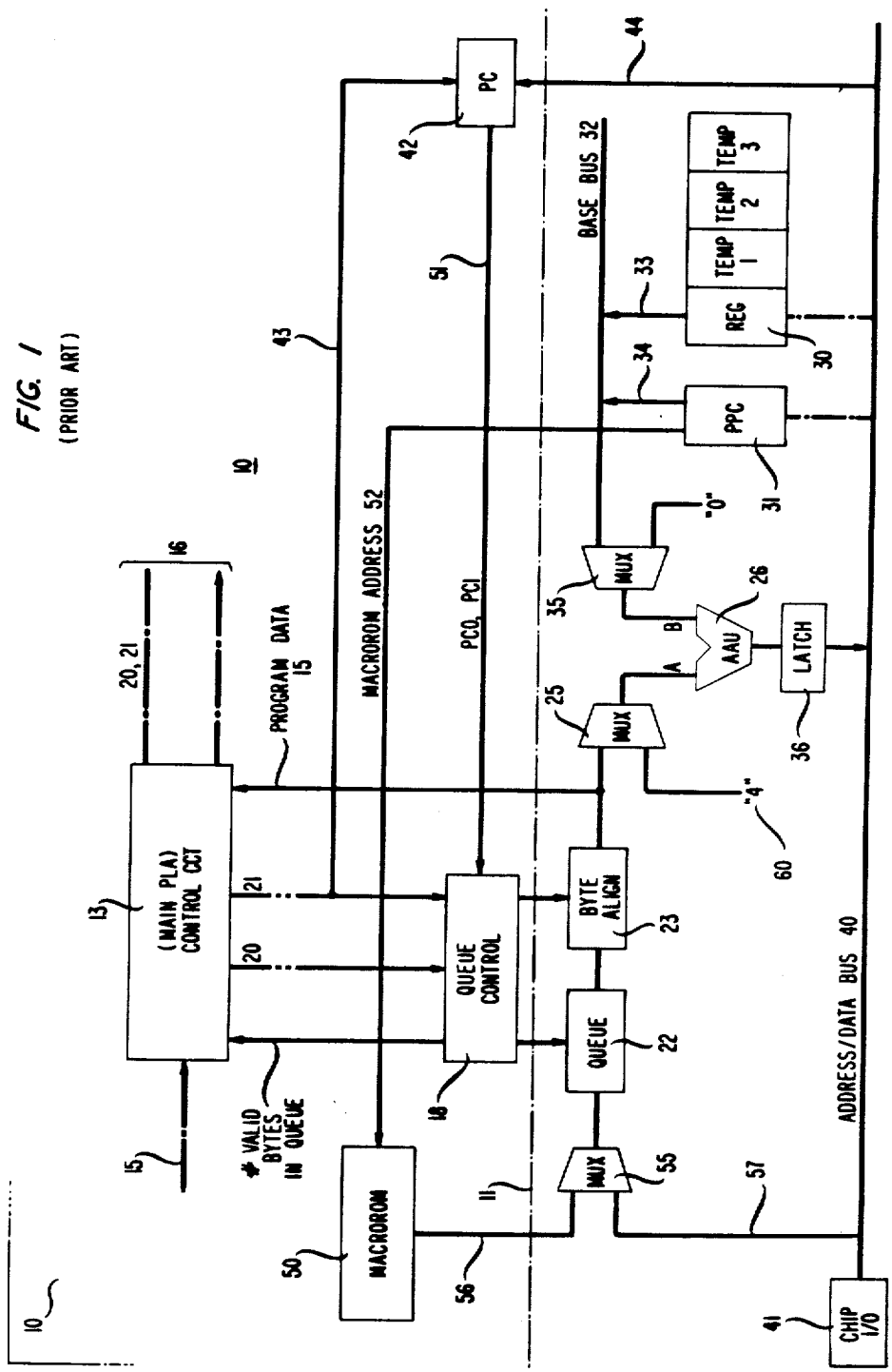
FIGS. 1 and 2 are block diagrams of a portion of a prior art microprocessor with a macro-rom and a single queue and a portion of a microprocessor in accordance with the present invention showing an improved augmented queue organization, respectively.

FIG. 1 shows a portion 10 of a prior art microprocessor chip. The chip has defined in and on it various diffusion, oxide and electrically conducting patterns which define functional blocks which cooperate with one another to perform microprocessor operation as is well known.

The functional blocks are well understood as to structure and operation and are not described in detail. They are merely represented as blocks and described only as to cooperation between blocks. The portion is divided into two segments by imaginary broken line 11. Above line 11, as viewed, is the control segment below the datapath segment.

Block 13 represents the master control or brain of the microprocessor. The brain comprises a main PLA responsive to an op-code applied at 15 to generate microcode at 16 for controlling the elements of the datapath in a well understood manner. The PLA includes input and output latches (not shown) which latch input and output information in a well understood manner.

The PLA responds to an op-code by providing signals to queue control 18 over lines 20 and 21 which constitute part of the microcode at 16. Outputs of queue control 18 are connected to queue 22 and byte alignment circuit 23. Outputs of circuit 23 and queue control 18 are connected to inputs to control circuit 13 as shown.

The output of byte alignment circuit 23 also is connected to output multiplexer (MUX) 25. The output of MUX 25 is connected to the A input of address arithmetic unit (AAU) 26. The output of temporary registers 30 and Prefetch Program Counter (PPC) 31 are connected to base bus 32 via representative lines 33 and 34. Bus 32 is connected to an input to MUX 35. The output of MUX 35 is connected to the B input to AAU 26. The output of AAU 26 is connected to the input to latch 36, the output of which, in turn is connected to address and data bus 40.

Address and data bits are applied to bus 40 and (via an I/O interface 41) to and from main memory (not shown) as is well understood. The data is stored in temporary registers 30 and tracked by counter 31 in a well understood manner. Program counter (PC) 42 also tracks the execution cycle under the control of control circuit (PLA) 13 via line 51 and 43 and is connected, to this end, to bus 40 as indicated by line 44. The outputs of PC 42 and PPC 31 are connected to queue control 18 and to macro-rom 50 as is indicated by lines 51 and 52, respectively.

The output of macro-rom 50 is connected to first inputs to input MUX 55 as represented by line 56. Bus 40 is connected to second inputs to MUX 55 as represented by bus 57 which is actually part of bus 40. Program data is stored in queue 22 once passed by bus 40 (57) and MUX 55.

In operation, PC 42 contains the address of the next consecutive byte in program memory to be executed. That next byte corresponds to the next byte of program available at byte align circuit 23. The second (prefetch) program counter (PPC 31) points to the next program word (32 bits) to be fetched and loaded into (program) queue 22. A program fetch is carried out by transferring the contents of PPC 31 to I/O 41 by way of bus 40 and to input B of AAU 26 by way of bus 32 and MUX 35. In addition, MUX 25 is controlled to select a constant 4 as the A input to AAU 26 as indicated at arrow 60.

The address (from PPC 31) appears on the appropriate address pins (not shown) during the next machine cycle of operation. Simultaneously, AAU 26 adds its two inputs (i.e., PPC+4). During the next cycle, the new address is transferred to PPC 31 via bus 40. During the present, or any subsequent cycle of operation, when the access is completed, the returned data is latched into I/O 41. During the next following cycle, the returned data is transferred to queue 22 by way of bus 40 and MUX 55. Simultaneously, with the transfer of the returned data, queue control 18 increments by 4 the number of valid bytes in the queue. The number of valid bytes must be known in order to determine whether execution can occur or whether it is necessary to fetch more program data. As program is executed, control 13 instructs queue control 18 and PC 42 to advance 1, 2, or 4 bytes, the increments in which the microprocessor is implemented to execute.

The following shows an illustrative program sequence including a macro-rom sequence for a prior art arrangement as shown in FIG. 1:

push src 1;
push src 2;
push src n;
push n;
macro offset;

The program averages n signed numbers leaving the average in register "0". The first n instructions push the n quantities to be averaged onto the stack in queue 22. The next instruction pushes the number n onto the stack. The last instruction is the macro-rom instruction which includes the offset into the macro-rom.

The following shows a prior art macro-rom sequence which does the averaging function:

offset:
  pop temp 1;
  mov temp 1, temp 2;
  clear RC;
loop:
  pop R1;
  add R1, R0;
  dec temp 2;
  BNZB (loop);
  DIV temp 1, R0;
  return;

The number n is read from the stack and is put into two on-chip registers (see 30 FIG. 1) which are unknown to the user. This is accomplished by placing n in temporary register 1 and moving the contents of register 1 to register 2. An accumulate loop is then executed for n iterations to form the sum of the n quantities. Finally, the sum is divided by n (still stored in temporary register 2) and the result is placed in register 0 (R0).

The macro instruction is executed by control 13 by transferring the contents of PC 42 to temporary register 3 (see 30 FIG. 1). The offset into macro-rom 50 is then loaded into PPC 31, the lower bits of which access macro-rom 50. MUX 55 is switched to the macro-rom and the queue is erased. After the first word of program is latched in queue 22, PPC 31 is incremented by 4 via AAU 26. This procedure is repeated for each macro-rom program word loaded into queue 22.

Each macro-rom sequence concludes with a return instruction which causes the value of temporary register 3 to be transferred to PC 42 and PPC 31. Also queue 22 is erased and MUX 55 is switched to bus 40. The number of valid queue bytes in queue 22 is zero. Consequently, operation continues by initiating a program fetch.

The mnemonics used in the various programs herein are defined as follows:
BNZB: Branch to address "loop" if the zero flag is not set, else continue.
(als def): Absolute deferred escape descriptor.
mov temp 1, temp 2: move instruction copies the contents of the first operand (temp 1) into the second (temp 2).
dec temp 2: decrement register temp 2
add R1, R0: add the contents of registers 0 and 1 storing the result in R0.
push & pop: normal push/pop stack inst.
src i: source data number i.
macro: a macro instruction.
offset: address in macro-rom of first macrosequence instruction.
temp i: temporary register i (unknown to the user).
clear R0: set register 0 to zero.

Figure 2:
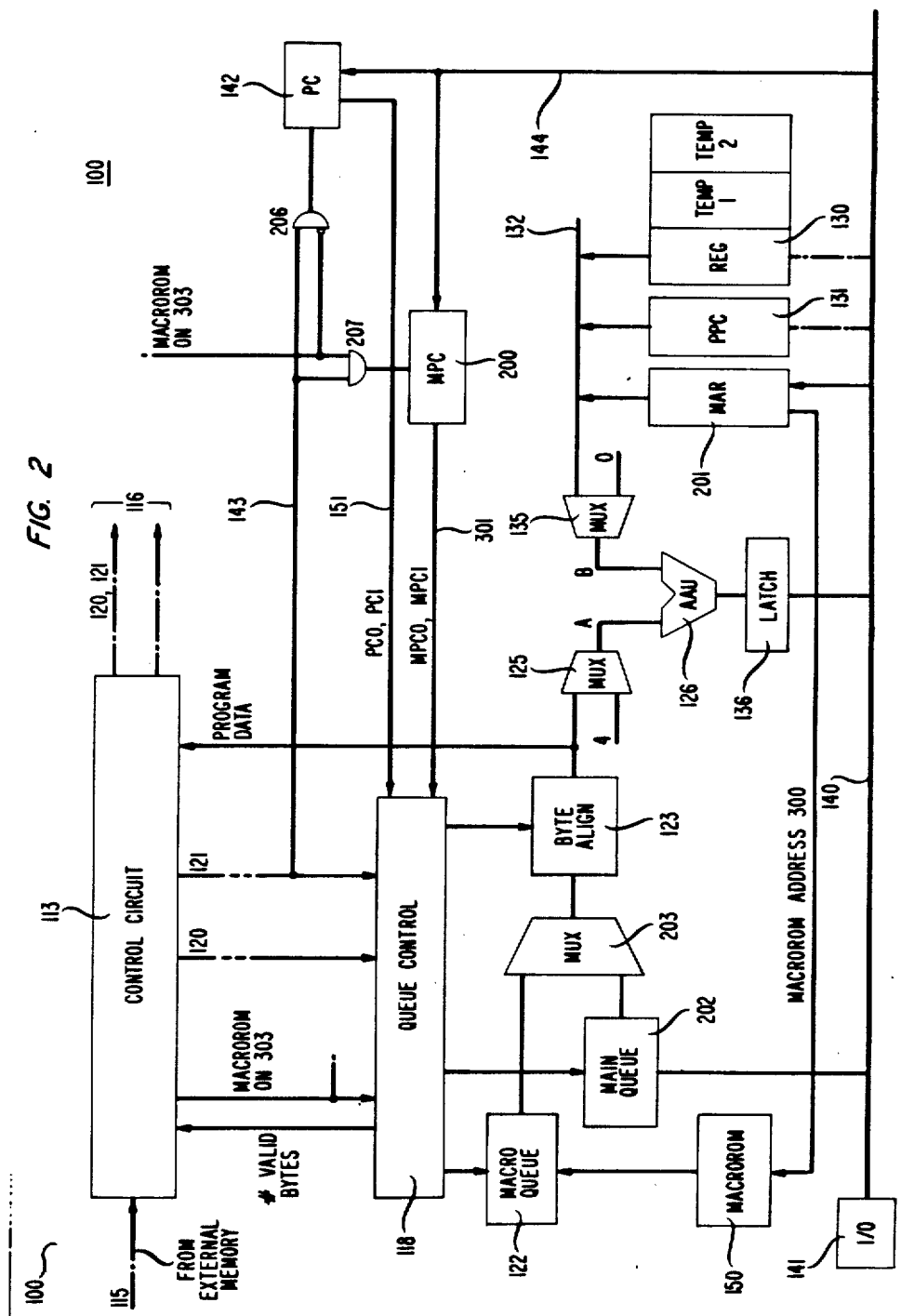

FIG. 2 shows a block diagram of a microprocessor organization including an augmented queue arrangement in accordance with the principles of this invention. Blocks in FIG. 2 which correspond to blocks of FIG. 1 are designated with the same designation as in FIG. 1 preceded by the numeral 1. Accordingly, the control circuit of FIG. 2 is designated 113 whereas the control circuit in FIG. 1 is designated 13. A comparison of FIGS. 1 and 2 shows the addition of blocks 200, 201, 202, 203 and OR circuits 206 and 207 in FIG. 2. These additional elements are responsible for a significant reduction in latency time and improved flexibility as mentioned hereinbefore.

Specifically, macro-rom program counter (MPC) 200 and macro-rom address register (MAR) 201 have been added. In addition second (main) queue 202 has been added with additional output MUX 203 between queues 122 and 202. The output of MAR 201 is connected to the input of macro-rom 150 via representative line 300. Similarly, the output of MPC 200 is connected to the input of queue control 118 as represented by line 301. Control circuit 113 provides an additional "macro-rom on" signal to queue control 118 via representative line 303.

Control circuit 113 also controls the operation of PC 142 and MPC 200 via OR circuits 206 and 207. One input to CR circuits 206 and 207 is connected directly and inverted respectively, from control circuit 113 via line 303 as shown. The other input is connected from control circuit 113 via representative line 143. An output of queue control 118 is connected to an input of each of queue 122 and queue 202 as indicated.

The program for the arrangement of FIG. 2 needed to implement the averaging program is as follows:

macro (offset) n, src 1, src 2 --- src n;

As can be seen, the program is reduced to a single macro-instruction which includes the offset into the macro-rom. The corresponding macrosequence is as follows:
offset: mov (abs def), temp 1; mov temp 1, temp 2; clear R0;
loop: add (abs def), R0; dec temp 2; BNZB (loop); Div. temp 1, R0; return;

The infrequently used addressing mode of "absolute deferred" has been selected arbitrarily as an illustrative example of an escape operand descriptor. When the macro-rom is on and a microsequence is being executed, an "escape" operand descriptor causes a temporary switch to main queue 202 for the extraction of only enough program to define one operand. Operation is then returned to the macro-rom for continued provision of program. The first two instructions, therefore, load n into temporary registers 1 and 2 (see 130 FIG. 2). The loop sequence executes n iterations where each iteration fetches the next input adding it to the partial sum contained in R0. Finally, the sum is divided by n with the result placed in R0. Program flow is returned to the main queue at this juncture until the next macro instruction occurs. Note that the next program instruction already resides in main queue 202 eliminating the latency associated with program fetches.

The embodiment of FIG. 2 demonstrates an improved configuration for incorporating a macro-rom into a microprocessor by using two program queues, one for normal program and the second exclusively for macro sequences. The advantages that result are a reduced latency associated with entering and terminating macrosequences and added flexibility in providing access to both macro code and normal program during the execution of the macrosequence. This configuration results in improved processor performance by reducing the number of instructions needed per macrosequence as well as the reduced number of clock cycles required when activating and terminating these sequences. Such a configuration is particularly useful for time critical applications such as for refreshing random access memories or the scanning of dynamically changing imput stations.

What is claimed is:

1. A microprocessor arrangement comprising a microprocessor portion together with first and second memories for respectively storing first and second program sequences of data, said microprocessor portion including first and second queues connected for receiving from said first and second memories said data of said first and second program sequences, respectively, and for delivering said data of said first and second sequences, respectively, to the microprocessor portion for processing by the microprocessor portion, and control means responsive to data constituting an instruction in said first program sequence for enabling said second queue to receive data of said second sequence from the second memory for processing by the microprocessor portion.

2. An arrangement in accordance with claim 1 wherein said microprocessor portion is integrated on a semiconductor chip and wherein said second memory comprises an on-chip memory.

3. A microprocessor arrangement in accordance with claim 2 wherein said on-chip memory comprises a macro-rom.

4. A microprocessor arrangement in accordance with claim 3 also including an output multiplexer connected to the outputs of said first and second queues and adapted for transmitting outputs from said first or second queues on a mutually exclusive basis under the control of said control means.

5. A microprocessor arrangement in accordance with claim 4 also including a byte align circuit connected to said output multiplexer to deliver aligned program data for processing by said microprocessor portion.

6. A microprocessor arrangement in accordance with claim 2 wherein said on-chip memory comprises a macro-rom, said microprocessor portion including means responsive to data constituting an instruction in said second program sequence for extracting data from said first program sequence in said first queue.

7. A microprocessor arrangement in accordance with claim 6 including means responsive to said data constituting said instruction in the second program sequence for disabling said macro-rom and said second queue from delivering data and for enabling said first queue to deliver data of said first program sequence to the microprocessor portion for processing by the microprocessor portion.

8. A microprocessor including a PLA and a macro-rom for cooperation with an external source of main program data sequences including a macro-instruction, said macro-rom storing macro-rom data sequences, first and second queues connected to said external source and said macro-rom, respectively, so as to receive data from said external source and from said macro-rom respectively and so as to deliver data from said first and second queues to the microprocessor for processing by the microprocessor, said PLA being responsive to said macro-instruction for selectively causing said macro-rom to deliver data to said second queue, means responsive to a first instruction in said macro-rom sequence for enabling said first queue to deliver data to the microprocessor for such processing and for thereafter enabling said second queue to resume delivering data to the microprocessor for such processing, and means responsive to a second instruction in said macro-rom sequence for disabling said macro-rom and said second queue from deliverng data and for enabling said first queue to deliver data of said main program sequence to the microprocessor for such processing.

* * * * *